United States Patent
Fritsche et al.

(10) Patent No.: US 8,851,346 B2
(45) Date of Patent: Oct. 7, 2014

(54) VEHICLE LOAD CARRIER BOX WITH FLEXIBLE SAFETY MATERIAL

(75) Inventors: Gunther Fritsche, Postbauer (DE); Andreas Blank, Deining (DE); Alexander Emmerling, Muhlhausen (DE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 13/996,489

(22) PCT Filed: Dec. 12, 2011

(86) PCT No.: PCT/EP2011/072442
§ 371 (c)(1),
(2), (4) Date: Jun. 20, 2013

(87) PCT Pub. No.: WO2012/084571
PCT Pub. Date: Jun. 28, 2012

(65) Prior Publication Data
US 2013/0320056 A1    Dec. 5, 2013

(30) Foreign Application Priority Data

Dec. 22, 2010    (EP) ..................................... 10196605

(51) Int. Cl.
*B60R 9/00*    (2006.01)
*E05D 15/50*    (2006.01)
*B60R 9/055*    (2006.01)

(52) U.S. Cl.
CPC ...................................... *B60R 9/055* (2013.01)
USPC ............... 224/324; 224/328; 16/231; 16/232; D12/413

(58) Field of Classification Search
CPC ........................................................ B60R 9/055
USPC ............. 224/328, 324; 16/231, 232; D12/413
See application file for complete search history.

(56) References Cited

U.S. PATENT DOCUMENTS

| 3,341,096 A | * | 9/1967 | Stanley ........................... 224/486 |
| 4,569,082 A | * | 2/1986 | Ainsworth et al. ............... 383/3 |
| 4,932,506 A | * | 6/1990 | Kim ............................... 190/111 |
| 5,538,169 A | * | 7/1996 | Moore ........................... 224/328 |

(Continued)

FOREIGN PATENT DOCUMENTS

EP    10196605.9    12/2010

OTHER PUBLICATIONS

Nternational Searching Authority, International Search Report for International Application No. PCT/EP2011/072442, dated Jan. 12, 2012.

(Continued)

*Primary Examiner* — Brian D Nash
*Assistant Examiner* — Derek Battisti
(74) *Attorney, Agent, or Firm* — Novak Druce Connolly Bove + Quigg LLP

(57) ABSTRACT

The present invention relates to a vehicle load carrier box (10) attachable to a surface of a vehicle (13) for transporting a load on the vehicle (13). The vehicle load carrier box (10) comprises a base member (20) defining a storage void, a lid (40) pivotally connected to the base member (20) and moveable between an opened and closed position. A flexible safety material is arranged inside of the vehicle load carrier box (10) and adapted to secure the load inside of the vehicle load carrier box (10) by overlapping the load.

20 Claims, 3 Drawing Sheets

(56) References Cited

U.S. PATENT DOCUMENTS

| | | | |
|---|---|---|---|
| 5,713,498 A * | 2/1998 | Cucci | 224/328 |
| 6,644,448 B2 * | 11/2003 | Bernbaum et al. | 190/111 |
| 7,980,436 B2 * | 7/2011 | Rodden et al. | 224/310 |
| 2006/0196745 A1 * | 9/2006 | Siwak | 190/110 |
| 2006/0208518 A1 * | 9/2006 | Ament et al. | 296/37.16 |
| 2007/0194185 A1 | 8/2007 | Carothers et al. | |
| 2007/0205240 A1 | 9/2007 | Castro et al. | |
| 2010/0006384 A1 * | 1/2010 | Napolitano et al. | 190/107 |

OTHER PUBLICATIONS

European Patent Office, Intention to Grant for European Application No. 10196605.9, dated Mar. 8, 2013.

International Preliminary Report on Patentability and Written Opinion mailed Jun. 25, 2013, in corresponding PCT patent application No. PCT/EP2011/072442.

* cited by examiner

VEHICLE LOAD CARRIER BOX WITH FLEXIBLE SAFETY MATERIAL

CROSS-REFERENCE TO RELATED APPLICATION

This application is a national phase application of international application no. PCT/EP2011/072442, which has an international filing date of Dec. 12, 2011, and which claims priority to EP application no. 10196605.9, filed Dec. 22, 2010, both of which applications are entirely incorporated by reference herein.

TECHNICAL FIELD

The present invention relates to a vehicle load carrier box having a flexible safety material inside of the vehicle load carrier box. The flexible safety material provides for increased safety as it is used to secure the load inside of the vehicle load carrier box.

BACKGROUND OF THE INVENTION

Vehicle load carrier boxes, such a cargo boxes or cargo trunks, are an effective way of transporting a load, e.g. luggage, on the roof of a vehicle. A vehicle load carrier box protects the cargo not only from the ambient environment, such as the wind, snow and rain but also from dirt such as dust and gravel. They are also relatively secure from theft and vandalism.

One advantage of the vehicle load carrier boxes are that they provide a confined storage void, or confined luggage compartment, as compared with conventional roof racks for example. Having a confined luggage compartment enables a user to simply load their luggage into the luggage compartment and close the lid of the vehicle load carrier box. No straps are generally required as with conventional roof racks. However, it has been found that the crash safety is readily improved if the load inside of the vehicle load carrier box is secured to the vehicle load carrier box itself. This can be done e.g. by straps, ropes or flexible nets. One such vehicle load carrier box is disclosed in the patent application No. US 2007/0205240 A1. In case of a severe crash, the load, such as a pointy object, skies for example, can penetrate the side wall of the vehicle load carrier box and in a worst case scenario escape the vehicle load carrier box. Such situations can very fast become very dangerous for people next to such crash incident. Ambient property and possessions could also be damaged.

Using a flexible net for securing load inside of the vehicle load carrier box often requires a user to first load the luggage and thereafter attaches the flexible net at predetermined points. This is time consuming and difficult as the procedure is usually practiced above the roof of the vehicle and inside the vehicle load carrier box were visibility is limited, especially for small users standing on the ground next to the vehicle. There is thus a need for an improved vehicle load carrier box which, if not solves, at least diminishes the drawbacks of the know solutions, or provides for a useful alternative to the known solutions.

SUMMARY OF THE INVENTION

It is an object of the present invention to provide for a solution to the above mentioned drawbacks or to diminish the drawbacks, or to provide for a useful alternative. More specifically, the objects of the present invention are met by a vehicle load carrier box attachable to a surface of a vehicle for transporting a load on the vehicle. The vehicle load carrier box comprises a base member defining a storage void, and a lid, preferably pivotally, connected to the base member and moveable between an opened and closed position.

A flexible safety material is arranged inside of the vehicle load carrier box and adapted to secure the load inside of the vehicle load carrier box by overlapping the load. The flexible safety material is attached to the lid thereby enabling the flexible safety material to be partly or fully displaced when the lid is moved between the opened and closed position.

The present invention provides for a vehicle load carrier box which is easy to use and handle while at the same time it provides for an increased crash safety should the vehicle collide. A user, such as the intended vehicle driver or a passenger, can easily load luggage into the vehicle load carrier box and thereafter close the lid. As the lid is closed, the flexible safety material is displaced and thus descends onto the luggage and secures the luggage to the vehicle load carrier box.

The present invention is particularly useful as a vehicle roof load carrier box, i.e. when the mentioned surface is a roof of the vehicle. The vehicle load carrier box is advantageously adapted to be arranged on a vehicle roof rack or a vehicle roof rack can be an integrated part of the vehicle load carrier box.

According to an aspect of the invention the flexible safety material is attached to both the base member and the lid thereby enabling the flexible safety material to only be partly displaced when the lid is moved between the open and closed position. It should be noted that the part attached to the base member is not considered to be displaced when the lid is moved between the opened and closed position.

According to an aspect of the invention, the base member comprises a floor and surrounding side walls defining a load carrier void. In this embodiment, the base member has a substantially tub or bowl like form.

According to an aspect of the invention, the base member has a first and a second transverse end and a first and a second longitudinal end. The base member thus has a substantially rectangular form. Likewise, the flexible safety material can have a first and a second transverse end and a first and a second longitudinal end, thus a substantially rectangular form.

According to an aspect of the invention, the length of the first and the second longitudinal ends of the flexible safety material are longer than the length of the first and the second longitudinal ends of the base member, and preferably longer than the first and the second ends of the lid. This enables the flexible safety material to be effectively seal off the first transverse end of the base member while still effectively extend along the full length of the longitudinal direction of the lid and thus cover any luggage inside of the vehicle load carrier box.

According to an aspect of the invention, the first transverse end of the flexible safety material is attached to, or in the proximity of, the first transverse end of the base member. Optionally the flexible safety material is attached to, or in the proximity of, the first transverse side wall of the base member, more preferably to the first transverse side wall of the base member. For example, the flexible safety material could be attached to reinforcement struts lid lifters, support hinges or the like, or to any item at the first transverse end of the base member which will be able to retain the flexible safety material at the first transverse end of the base member.

According to an aspect of the invention, the second transverse end of the flexible safety material is attached to, or in the proximity of, the second transverse end, and/or preferably the side wall, of the lid.

According to an aspect of the invention the flexible safety material comprises at least a first, a second a third and a forth attachment point wherein at least the first attachment point is attached to the base member and at least the second, third and forth attachment points are attached to the lid. The attachment points can be more than just mentioned. It is advantageous that there is at least three attachment points to the base member, these three attachment points are preferably arranged at the first transverse end of the base member as this will provide for an improved crash safety. According to an aspect of the invention the first attachment point is attached in the proximity of the first transverse end of the base member.

According to an aspect of the invention the flexible safety material is attached to the base member at a plurality of attachment points. According to an aspect of the invention the flexible safety material is attached to the lid at a plurality of attachment points.

BRIEF DESCRIPTION OF THE DRAWINGS

The present invention is described in greater detail with reference to the accompanying figures in which.

DETAILED DESCRIPTION OF PREFERRED EMBODIMENTS

Figure 1:
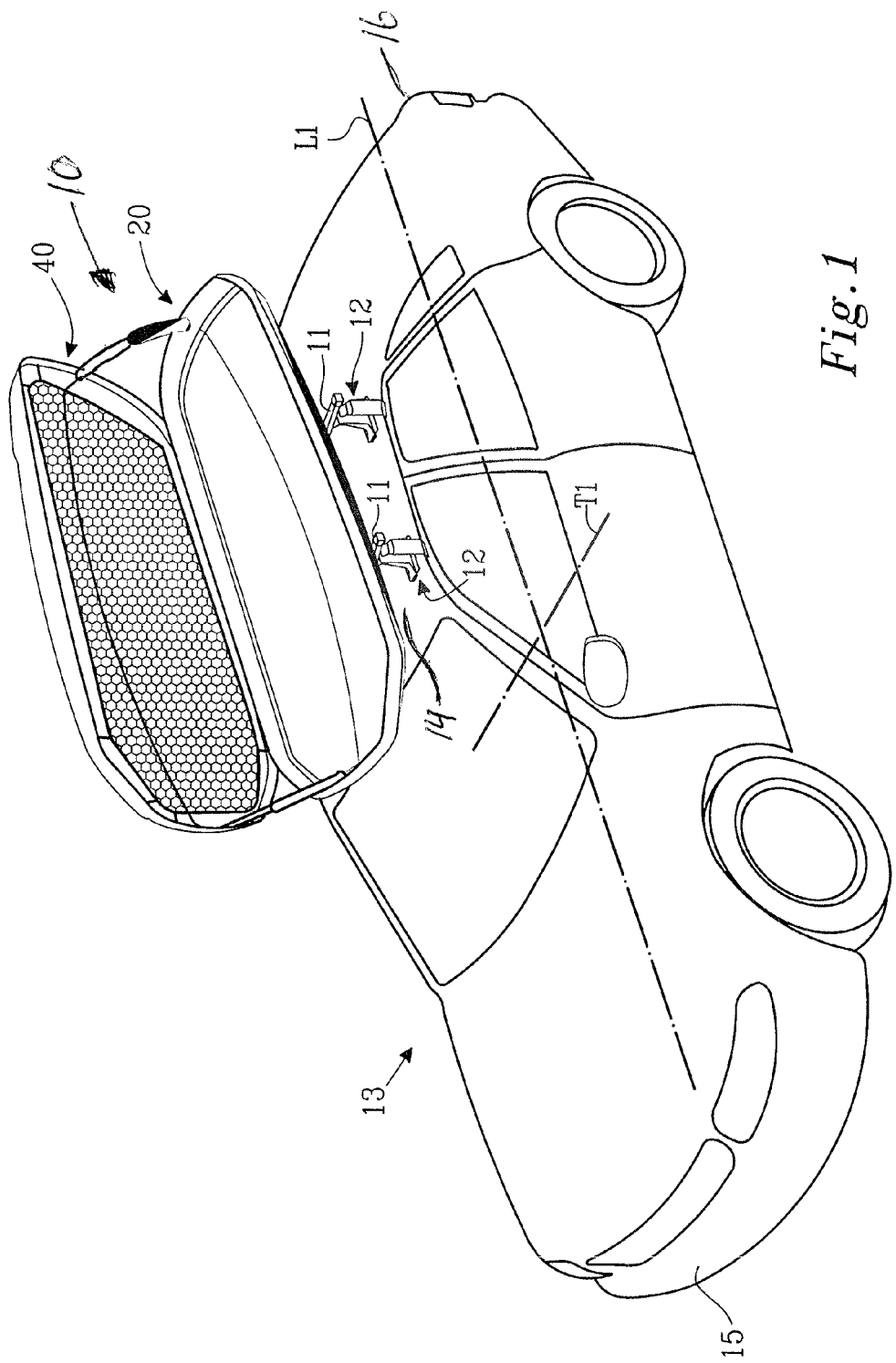
FIG. 1 shows a vehicle with a vehicle load carrier box according to an embodiment of the present invention with the lid in an opened position.

FIG. 1 shows a perspective view of a vehicle 13, in this case a car, with a vehicle load carrier box 10 mounted on cross bars 11 of a roof rack 12 of the vehicle 13. The roof rack 12 is mounted on the roof 14 of the vehicle. The vehicle 13 has a longitudinal axis L1 which extends in a direction perpendicular to a transverse axis T1 of the vehicle. The cross bars 11 extends parallel with the transverse axis T1 and across the roof 14 of the vehicle 13. The vehicle 13 further has a forward end 15 and a backward end 16. As noticed, the vehicle load carrier box 10 is opened and ready to be loaded with a load, such as luggage, skies, clothes, bags, suitcases, food or the like.

The vehicle load carrier box 10 comprises a base member 20 and a closeable lid 40 which together defines a confined storage void. The base member 20 and the closeable lid 40 are formed by a rigid material, e.g. thermoplastic material such as polypropylene, polyethylene, polyurethane, and/or a carbon fiber reinforced polymeric material, carbon fiber, aluminum or the like.

Figure 2:
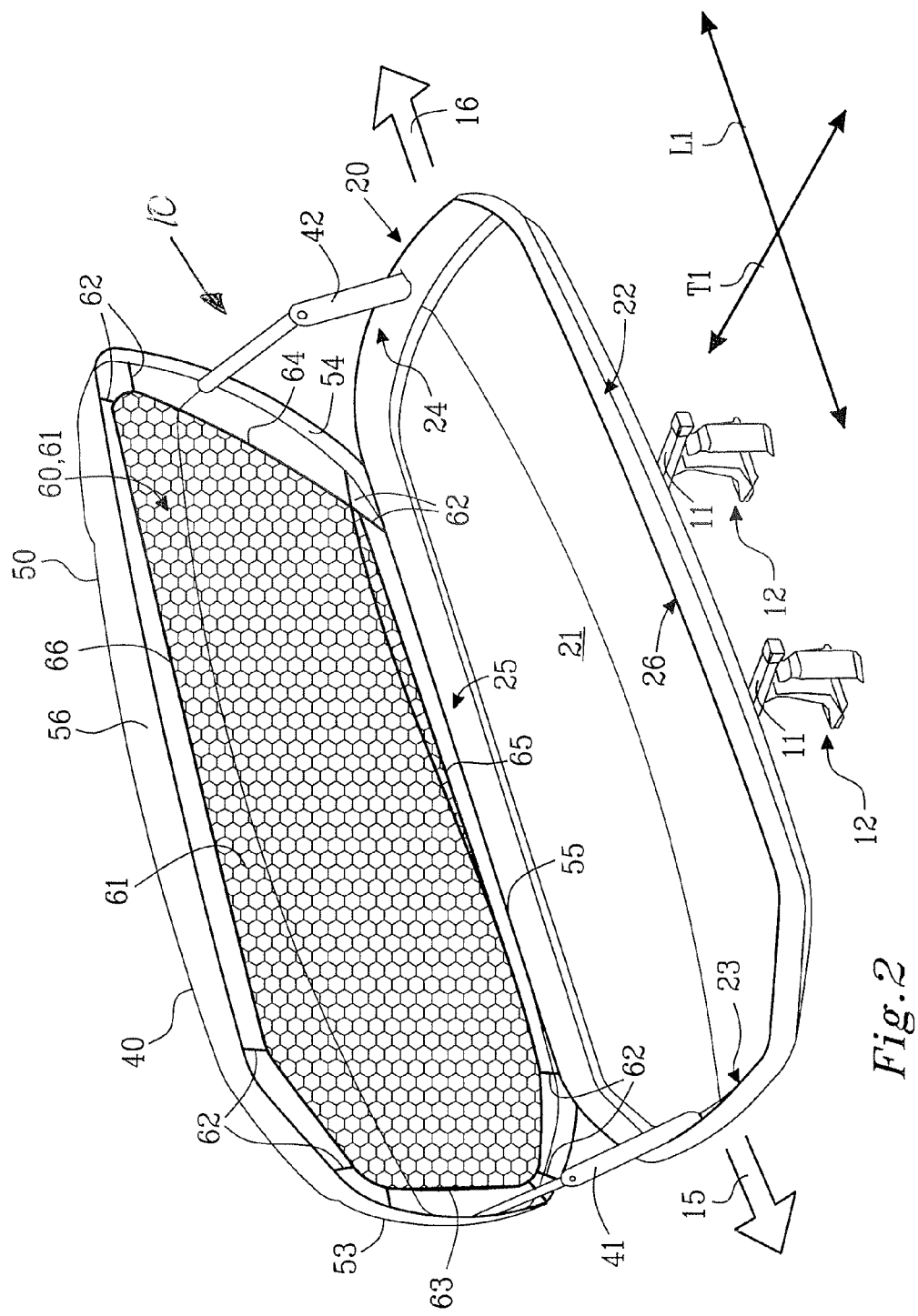
FIG. 2 shows the vehicle load carrier box shown in FIG. 1 with the lid in an opened position.
Figure 3:
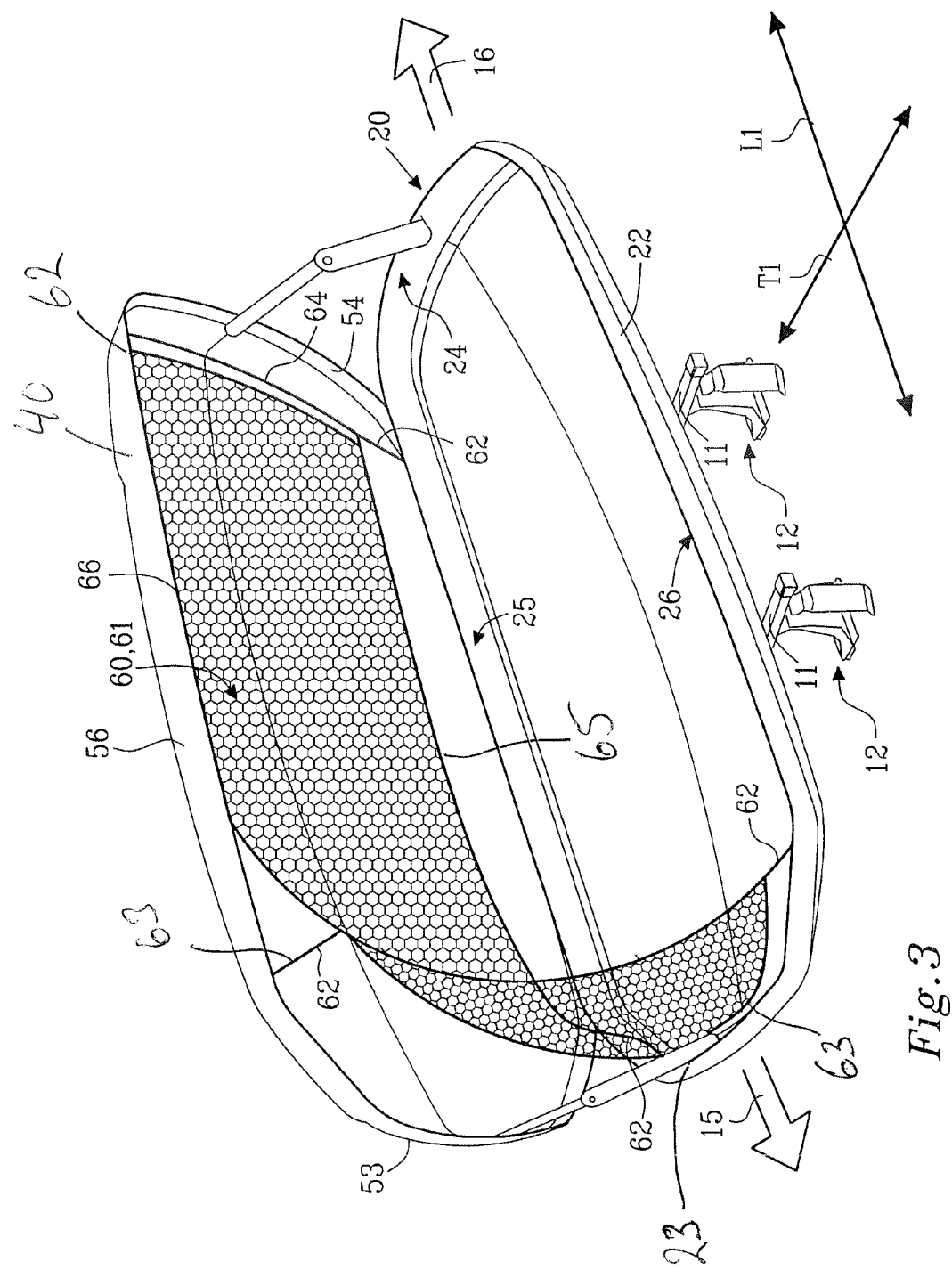
FIG. 3 shows a vehicle load carrier box according to a second embodiment of the present invention with the lid in an opened position.

Turning to FIG. 2, the base member 20 includes a floor 21 surrounded by a side wall 22 which defines a load carrier void. The side wall 22 can be said to comprise a first and a second transverse side wall 23, 24 and a first and a second longitudinal side wall 25, 26. In the shown embodiments, the first and the second transverse side wall 23, 24 and the first and the second longitudinal side wall 25, 26 are equivalent with a first and a second transverse end and a first and a second longitudinal end of the base member. The first transverse side wall 23 is positioned towards the forward end 15 of the vehicle 13 while the second transverse side wall 24 is positioned towards the backward end 16 of the vehicle 13. The forward and backward ends 15, 16 of the vehicle are indicated in FIGS. 2 and 3 with the reference numbers 15 and 16.

A lid 40 is displaceable connected, in this case pivotally, to the base member 20. The lid 40 can be positioned in an open position, as shown in FIGS. 1, 2 and 3, and a closed position (not shown). The lid 40 together with the base member 20 forms a confined storage void which dependent on the position of the lid 40, can be defined as opened or closed.

The lid 40 is preferably pivotally connected to the base member 20 using hinges or a flexible material such as leather or a woven material. A first and a second hinge arm 41, 42 is arranged at each transverse end to support the lid 40 in an opened position with respect to the base member 20. The hinge arms 41, 42 can in an embodiment be reinforcement strut lid lifters.

As mentioned, a confined storage void is formed by the lid 40 and the base member 20. The lid 40 comprises a lid roof 50 and a side wall 51 surrounding the lid roof 50, which together defines a load carrier void of the lid 40. The surrounding side wall 51 includes a first and a second transverse side wall 53, 54 and a first and a second longitudinal side wall 55, 56. In the shown embodiments, the first and the second transverse side wall 53, 54 and the first and the second longitudinal side wall 55, 56 are equivalent with a first and a second transverse end and a first and a second longitudinal end of the base member. As the vehicle load carrier box 10 is in the closed position, the surrounding side walls 51 of the lid 40 is positioned adjacent the side wall 22 of the base member 20 thus forming a confined storage compartment. The periphery of the lid 40 is just somewhat larger than the periphery of the base member 20 so that the surrounding side wall 51 of the lid 40 partly overlaps the surrounding side wall 21 of the base member 20 when the lid 40 is closed.

The vehicle load carrier box 10 thus further comprises at least one flexible safety material 60 attached to the lid 40. If cargo or luggage, or any other load, is accidentally displaced inside of the vehicle load carrier box 20, it could be a potential risk for damaging the vehicle load carrier box 20. In a worst case scenario, the surrounding walls of the vehicle load carrier box 20 could be penetrated by the parts of the load accidentally, e.g. during a collision with another vehicle. After the vehicle load carrier box 20 is loaded, the load is thus secured inside of the vehicle load carrier box 10, and thus substantially prevented from being accidentally displaced, simply by closing the lid 40.

The flexible safety material 60 should preferably be a sheet like material, for example with a length to width ratio (length:width) of between 10:1 to 10:5. The flexible safety material is advantageously adapted to be positioned on any load, such as luggage, bags, suitcases, skies or the like which are positioned inside of the vehicle load carrier box. More specifically is it intended to cover any load positioned in the load carrier void of the base member 20. The flexible safety material can be a cloth, woven, net or the like. In FIGS. 1-3 the flexible safety material 60 is illustrated as a net 61. The flexible safety material 60 can have elastic properties or substantially no elastic properties, or simply no elastic properties. Advantageously both flexible and elastic properties are present. The flexible safety material 60, and the flexible net 61, has in the shown embodiments in FIGS. 1-3, a first and a second transverse end 63, 64 and a first and a second longitudinal end 65, 66, thus a substantially rectangular form.

In the embodiment shown in FIGS. 1 and 2 the flexible safety material 60 is attached only to the lid 40, and thus not to the base member 20. The embodiment shown in FIGS. 1 and 2 has a flexible safety material 60 which is attached to the lid 40 at a plurality of attachment points 62. The attachment points 62 can be fixed, i.e. permanent or be temporarily i.e. the flexible safety material 60 can be detachable. Optionally some of the attachment points 62 can be permanent and some of the attachment points 62 can be temporarily. The attachment points 62 can further be elastic or non elastic, although elastic is preferable.

In the embodiment shown in FIG. 3, the flexible safety material 60 is partly attached to the lid 40 of the vehicle load carrier box 20. Because the flexible safety material 60 is partly attached to the lid 40, a user which has loaded e.g. luggage into the vehicle load carrier box 20, can simply close the lid 40 to superpose the flexible safety material 60 on the luggage.

An advantageous embodiment is shown in FIG. 3. Same features in FIGS. 1, 2 and 3 are referred to with the same reference number. In FIG. 3, the flexible safety material 60 is partly attached to the lid 40 and partly to the base member 20. To improve the safety of the vehicle load carrier box 20, the flexible safety material 60 is at least attached in the proximity of the first transverse side wall 23 of the base member 20. Advantageously the first transverse end 63 of the flexible safety material 60 is attached in the proximity of the first transverse side wall 23 of the base member 20 and preferably along the first transverse side wall 23 of the base member 20. Advantageously the second transverse end 64 of the flexible safety material 60 is attached in the proximity of the second transverse side wall 54 of the lid 40 and preferably along the second transverse side wall 54 of the lid 40.

In FIG. 2, the flexible safety material 60, in this case a net 61, is attached to the first transverse side wall 23 of the base member 20. The flexible safety material 60 is advantageously attached with at least three attachment points or preferably substantially along the whole length of the first transverse side wall 23 of the base member 20 as shown in FIG. 3. From a crash safety perspective, it is very advantageous that the flexible safety material is attached at least in the proximity of the first transverse end 23 of the base member 20 as this will prevent any luggage or load from escaping the vehicle load carrier box 10 during a severe collision.

Optionally, the flexible safety material 60 is attached to the lid 40 at the second transverse side wall 54 of the lid 40 and at least partly along the first and second longitudinal side walls 55, 56 of the lid 40, i.e. on the side walls or in the near proximity of the side walls.

The vehicle load carrier box 10 can be have a drag reducing outer surface structure to reduce the wind resistance imparted by the vehicle load carrier box 10. The lid 40 or the base member 20 can of course be provided with a lock.

The load, e.g. luggage, is generally placed on the floor 21 of the base member 20 during loading of the vehicle load carrier box 10. After placing the luggage on the floor 21 of the base member 20, the lid 40 is closed, thus confining the luggage within the vehicle load carrier box 10. Due to that the flexible safety material 60 is attached to the lid 40, the flexible safety material 40 is positioned onto the luggage as the flexible safety material 60 as the lid 40 is closed, and can impart the luggage with a downwardly force component or optionally just be positioned over the luggage.

In the embodiment shown in FIGS. 1-3, the flexible safety material 60 effectively prevents the luggage from escaping the confined luggage compartment within the vehicle load carrier box 10 in case of a collision or the like, without a user having to arrange the flexible safety material in any specific way after loading. The embodiment shown in FIG. 3 has been found to the very effective in cases of frontal collisions between a vehicle, like the vehicle 13, and another object such as another vehicle, as the flexible safety material 60 will effectively prevent or at least make it more difficult for any object to penetrate through the surrounding side wall 51 of the lid 40 due to its inherent inertia.

According to an embodiment of the present invention, the flexible safety net 60 is attached to both the lid 40 and the base member 20 thus enabling a user to displace parts of the flexible safety material 60 when moving the lid 40 between the opened and closed position. This improves the crash safety aspect to the vehicle load carrier box as the flexible safety net will better retain the objects inside of the vehicle load carrier box.

In FIG. 3, the flexible safety material 60 is attached at attachment points 62 and at selected locations along the length of the lid 40, specifically along parts of the second longitudinal side wall 56 of the lid 40. An elastic strap 63 is arranged in the proximity of the intersection between the first transverse side wall 53 and the second longitudinal side wall 56 of the lid 40, to retain the flexible safety material 60 to the lid 40 in that section. This keeps the flexible safety net 60 to the lid 40 and enables a user to load the vehicle load carrier box 10 without being obstructed by the flexible safety material 60.

The invention claimed is:

1. A vehicle roof load carrier box attachable to a roof of a vehicle for transporting a load on said vehicle, said vehicle roof load carrier box comprising:
    a base member defining a storage void, said base member having first transverse wall and a second transverse wall;
    a lid connected to said base member and moveable between an opened and closed position, said lid having a first transverse end and a second transverse end; and
    a flexible safety material comprising at least one of a net, a cloth material and a woven material, arranged inside of said vehicle roof load carrier box and configured to secure said load inside of said vehicle roof load carrier box by overlapping said load, said flexible safety material having a first transverse end and a second transverse end,
    said second transverse end of said flexible safety material is attached to said second transverse end of said lid, and unattached to said first transverse end of said lid, thereby enabling said flexible safety material to be at least partly displaced when said lid is moved between the opened and closed position,
    said first transverse end of said flexible safety material is attached to said first transverse end of said base member, thereby enabling said flexible safety material to be at least partly displaced when said lid is moved between the opened and closed position.

2. The vehicle roof load carrier box according to claim 1, wherein said surface is a roof and wherein said vehicle roof load carrier box is configured to be arranged on said roof of said vehicle.

3. The vehicle roof load carrier box according to claim 2, wherein said vehicle roof load carrier box is configured to be arranged on a vehicle roof rack.

4. The vehicle roof load carrier box according to claim 1, wherein said base member comprises a floor and surrounding side walls defining a load carrier void.

5. The vehicle roof load carrier box according to claim 2, wherein said base member comprises a floor and surrounding side walls defining a load carrier void.

6. The vehicle roof load carrier box according to claim 4, wherein said base member has a first and a second transverse end and a first and a second longitudinal end, and wherein said flexible safety material has a first and a second transverse end and a first and a second longitudinal end.

7. The vehicle roof load carrier box according to claim 6, wherein said first transverse end of said flexible safety material is proximate said first transverse side wall of said base member.

8. The vehicle roof load carrier box according to claim 6, wherein said second transverse end of said flexible safety material is proximate said second transverse side wall of said lid.

9. The vehicle roof load carrier box according to claim 7, wherein said second transverse end of said flexible safety material is proximate said second transverse side wall of said lid.

10. The vehicle roof load carrier box according to claim 1, wherein said flexible safety material comprises at least a first, a second a third and a fourth attachment point wherein at least said first attachment point is attached to said base member and at least said second, third and fourth attachment points are attached to said lid.

11. The vehicle roof load carrier box according to claim 2, wherein said flexible safety material comprises at least a first, a second a third and a fourth attachment point wherein at least said first attachment point is attached to said base member and at least said second, third and fourth attachment points are attached to said lid.

12. The vehicle roof load carrier box according to claim 8, wherein said first attachment point is attached in the proximity of said first transverse end of said base member.

13. The vehicle roof load carrier box according to claim 1, wherein said flexible safety material is attached to said base member at a plurality of attachment points.

14. The vehicle roof load carrier box according to claim 2, wherein said flexible safety material is attached to said base member at a plurality of attachment points.

15. The vehicle roof load carrier box according to claim 1, wherein said flexible safety material is attached to said lid at a plurality of attachment points.

16. The vehicle roof load carrier box according to claim 2, wherein said flexible safety material is attached to said lid at a plurality of attachment points.

17. The vehicle roof load carrier box according to claim 1, wherein said base member and said lid are formed by a rigid material.

18. The vehicle roof load carrier box according to claim 2, wherein said base member and said lid are formed by a rigid material.

19. The vehicle roof load carrier box according to claim 1, wherein said base member and said lid are pivotally connected.

20. The vehicle roof load carrier box according to claim 1, wherein said flexible safety material is attached to said lid around the periphery of the flexible safety material at attachment points.

* * * * *